United States Patent
Hwang et al.

(10) Patent No.: US 6,825,580 B2
(45) Date of Patent: Nov. 30, 2004

(54) APPARATUS AND METHOD FOR CONTROLLING COOLING OF GANTRY HAVING LINEAR MOTOR

(75) Inventors: Ji Hyun Hwang, Kyungki-do (KR); Do Hyun Kim, Kyoungki-do (KR); Ki Ha Lee, Seoul (KR)

(73) Assignee: Mirae Corporation, Choongchungnam-do (KR)

( * ) Notice: Subject to any disclaimer, the term of this patent is extended or adjusted under 35 U.S.C. 154(b) by 0 days.

(21) Appl. No.: 09/777,689

(22) Filed: Feb. 7, 2001

(65) Prior Publication Data

US 2002/0047355 A1 Apr. 25, 2002

(30) Foreign Application Priority Data

Apr. 7, 2000 (KR) ........................................ 2000-18126
Apr. 7, 2000 (KR) ........................................ 2000-18127

(51) Int. Cl.[7] .............................................. H02K 41/00
(52) U.S. Cl. ....................................................... 310/12
(58) Field of Search .............................. 310/12, 53, 62, 310/63; 427/96; 228/102

(56) References Cited

U.S. PATENT DOCUMENTS

| | | | | |
|---|---|---|---|---|
| 4,470,092 A | * | 9/1984 | Lombardi ..................... | 361/23 |
| 4,494,184 A | * | 1/1985 | Crevel ......................... | 700/73 |
| 4,520,300 A | * | 5/1985 | Fradella ....................... | 318/603 |
| 4,536,690 A | * | 8/1985 | Besterling et al. ........... | 318/697 |
| 4,542,324 A | * | 9/1985 | Leuthen ....................... | 318/798 |
| 4,839,545 A | | 6/1989 | Chitayat ...................... | 310/12 |
| 4,855,674 A | * | 8/1989 | Murate et al. ................. | 700/37 |
| 4,907,021 A | * | 3/1990 | Yabu ........................... | 353/101 |
| 5,053,685 A | * | 10/1991 | Bacchi ........................ | 318/135 |
| 5,258,671 A | | 11/1993 | Vollenwyder et al. ......... | 310/12 |
| 5,349,256 A | * | 9/1994 | Holliday ...................... | 310/12 |
| 5,449,961 A | * | 9/1995 | Ludwig et al. ................ | 310/58 |
| 5,701,044 A | * | 12/1997 | Emshoff et al. ............... | 310/54 |
| 5,807,606 A | * | 9/1998 | Mould et al. ................. | 427/10 |
| 5,828,501 A | * | 10/1998 | Menard et al. ............... | 359/819 |
| 5,834,862 A | | 11/1998 | Hartzell, Jr. ................. | 310/12 |
| 5,838,359 A | * | 11/1998 | Hoover ........................ | 347/250 |
| 6,069,416 A | * | 5/2000 | Chitayat ...................... | 310/12 |
| 6,069,418 A | * | 5/2000 | Tanaka ........................ | 310/12 |
| 6,114,781 A | * | 9/2000 | Hazelton et al. .............. | 310/12 |
| 6,226,073 B1 | * | 5/2001 | Emoto ......................... | 355/53 |
| 6,262,503 B1 | * | 7/2001 | Liebman et al. .............. | 310/64 |
| 6,269,846 B1 | * | 8/2001 | Overbeck et al. ............. | 141/1 |
| 6,324,858 B1 | * | 12/2001 | Holden ........................ | 62/211 |
| 6,329,732 B1 | * | 12/2001 | Straley ....................... | 310/68 B |
| 6,359,359 B1 | * | 3/2002 | Miura et al. ............. | 310/156.43 |
| 6,437,481 B2 | * | 8/2002 | Senda et al. ................ | 310/317 |

FOREIGN PATENT DOCUMENTS

JP          354106969 A  *  8/1979  ............. B04B/9/00

* cited by examiner

*Primary Examiner*—Thanh Lam
*Assistant Examiner*—Judson H. Jones
(74) *Attorney, Agent, or Firm*—Fleshner & Kim, LLP (57) ABSTRACT

An apparatus for controlling cooling of a gantry having a linear motor includes: a stator provided with a first temperature sensor, having a heat sink and a cooling fan at predetermined portions of an X-axis and an Y-axis linear motors; a mover provided with a second temperature sensor, having a heat sink installed on the upper surface of an X-axis and a Y-axis linear motors; an encoder for sensing a position and velocity of the mover; an encoder periphery sensor part for measuring surroundings (a temperature, a humidity and a pressure) of the encoder; an A/D converter for receiving a first and a second temperature signals and converting them from an analog signal to a digital signal and outputting the same; a controller for controlling a drive signal outputted from a mover driver unit to control the velocity of the Y-axis linear motor and the X-axis linear motor; a D/V converter for converting digital signals, that is, a cooling fan control signal and an air valve control signal to a plurality of drive signals, that is, analog signals; and a mover driver for providing the drive signal to a coil block.

25 Claims, 7 Drawing Sheets

APPARATUS AND METHOD FOR CONTROLLING COOLING OF GANTRY HAVING LINEAR MOTOR

BACKGROUND OF THE INVENTION

1. Field of the Invention

The present invention relates to an apparatus and method for controlling cooling of a gantry having a linear motor, and more particularly to an apparatus and method for controlling cooling of a gantry in which peripheral environment of a linear motor of a gantry is measured, and if a gantry is overheated, it is cooled by using a cooling fan or an air nozzle.

2. Description of the Background Art

Generally, a surface mounting device (SMD) is to mount electronic components on a printed circuit board (PCB), for which an X-Y gantry including a pickup module is employed and a linear motor is adopted to the X-Y gantry as a driving force.

Figure 1:
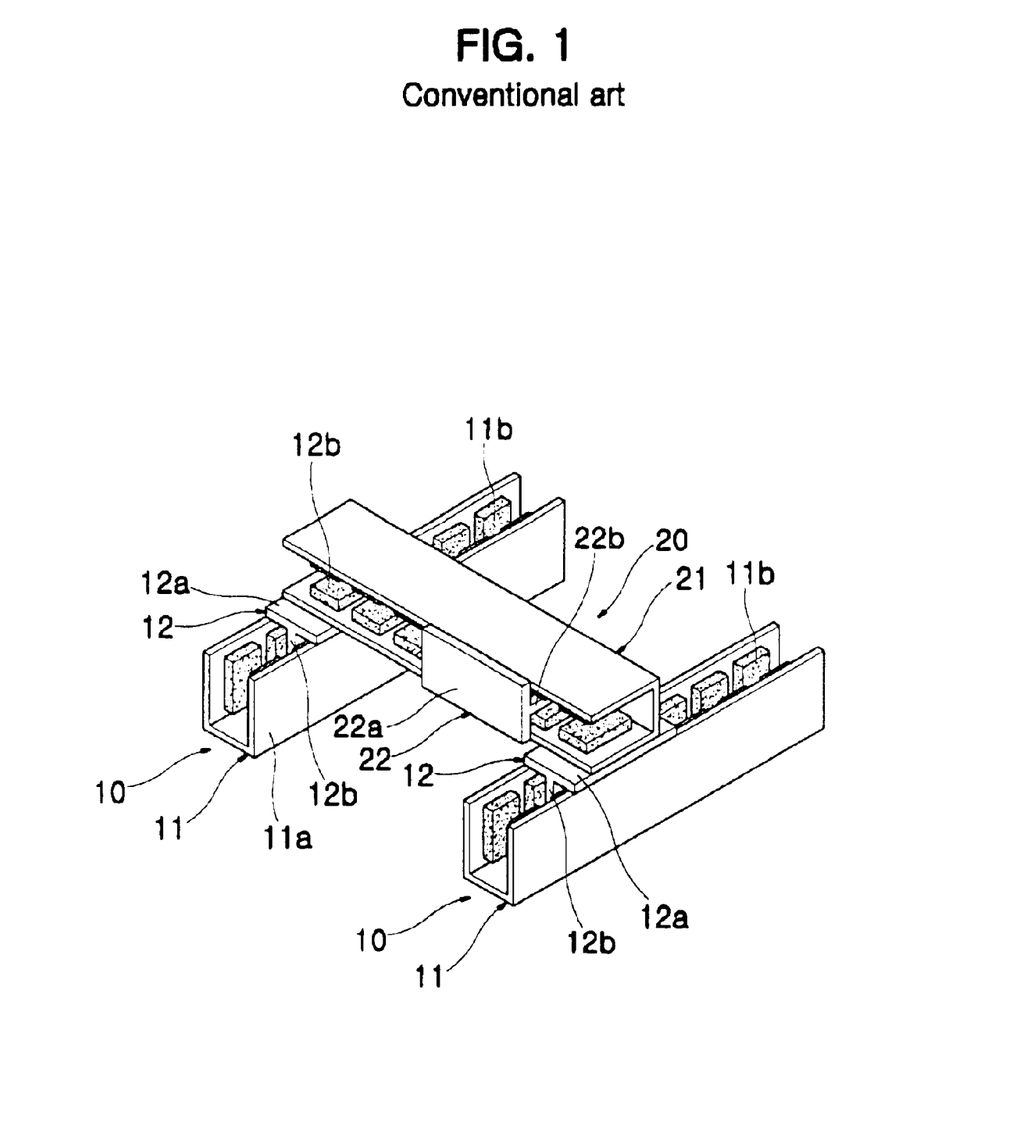
FIG. 1 is a perspective view of a gantry adopting a linear motor in accordance with a conventional art.

FIG. 1 is a schematic perspective view of a gantry having a linear motor in accordance with a conventional art.

As shown in the drawing, the conventional gantry includes a plurality of linear motors 10 adopted to a Y-axis frame and a linear motor 20 adopted to an X-axis frame.

Each linear motor 10 adopted to the Y-axis frame includes a stator 11 and a mover 12. The stator 11 includes a 'U'-type frame 11a and a plurality of permanent magnets 11b arranged at predetermined intervals at the inner both side surfaces of the 'U'-type frame 11a. The mover 12 includes a flat-type frame 12a and a coil block 12b formed at the bottom surface of the flat-type frame 12a. The coil block 12b is formed in a manner that a plurality of coils (not shown) are arranged at predetermined intervals at the bottom surface of the flat type frame 12a and molded by an insulating material.

The linear motor 20 adopted to the X-axis frame installed on the mover 12 of the linear motors 10 of the Y-axis frame also includes a stator 21 and a mover 22, similarly to the linear motors 10 of the Y-axis frame.

The stator 21 includes a 'U'-type frame 21a and a plurality of permanent magnets 21b, and the mover 22 includes a flat-type frame 22a and a coil block 22b with a plurality of coils (not shown) arranged.

With the X-Y gantry constructed as described above, a pickup module (not shown) for pick and place components is installed at a predetermined portion of the mover 22 of the linear motor 20 adopted to the X-axis frame. Movement of the pickup module in the X-axis direction is made by the mover 22 of the X-axis linear motor 20, while movement of the pickup module in the Y-axis direction is made by the mover 12 of the plurality of linear motors 10 of the Y-axis frame.

In order for the pickup module to pick up and place electronic components on a printed circuit board (not shown), the upper portion of the printed circuit board is moved in the X-Y direction by the mover 12 of the Y-axis linear motor 110 and the mover 22 of the X-axis linear motor 20.

In order to move the pickup module in a predetermined direction, the Y-axis linear motor 10 and the X-axis linear motor 20 are used for a long time. In this case, heat is generated from the coil blocks 12b and 22b formed at each stators 12 and 22. That is, the coil blocks 12b and 22b formed at the stators 12 and 22 includes the plurality of coils, so that when a driving power source is continuously supplied to the plurality of coils, heat is inevitably generated.

Conventionally, however, there is no method for removing the heat generated from the Y-axis linear motors 10 and the X-axis linear motor 20, so that the linear motor is overloaded, causing that the gantry is stopped or malfunctioned.

SUMMARY OF THE INVENTION

Therefore, an object of the present invention is to provide an apparatus and method for controlling cooling of a gantry having a linear motor which is capable of controlling a velocity of an Y-axis linear motor and an X-axis linear motor to lower down heat of a linear motor when the linear motor of a gantry is overheated.

Another object of the present invention is to provide an apparatus and method for controlling cooling of a gantry having a linear motor which is capable of cooling an overheated linear motor by driving a cooling unit when the linear motor of a gantry is overheated.

To achieve these and other advantages and in accordance with the purpose of the present invention, as embodied and broadly described herein, there is provided an apparatus for controlling cooling of a gantry having a linear motor including: a stator provided with a first temperature sensor, having a heat sink and a cooling fan at predetermined portions of an X-axis and an Y-axis linear motors; a mover provided with a second temperature sensor, having a heat sink installed on the upper surface of an X-axis and a Y-axis linear motors; an encoder for sensing a position and velocity of the mover; an encoder periphery sensor part for measuring surroundings (a temperature, a humidity and a pressure) of the encoder; an A/D converter for receiving a first and a second temperature signals and converting them from an analog signal to a digital signal and outputting the same; a controller for controlling a drive signal outputted from a mover driver unit to control the velocity of the Y-axis linear motor and the X-axis linear motor; a D/V converter for converting digital signals, that is, a cooling fan control signal and an air valve control signal to a plurality of drive signals, that is, analog signals; and a mover driver for providing the drive signal to a coil block.

To achieve to above objects, there is also provided a method for controlling cooling of a gantry including the steps of: operating at least one mover (S11); measuring temperatures of an X-axis and a Y-axis stators (Txs, Tys) by means of temperature sensors (S12); measuring temperatures of an X-axis and a Y-axis movers (Txm, Tym) by means of temperature sensors (S13); storing the measured temperature (Txs, Tys, Txm and Tym) on the stators and movers and comparing them with a pre-set temperature, that is, a comparative value (S14); storing the temperature information (Txs, Tys, Txm and Tym), comparing them with the comparative value of the pre-set temperature, and computing a difference between them in case that the temperatures (Txs, Tys, Txm and Tym) are greater than the pre-set comparative value (S15); computing a temperature gain corresponding to the computed temperature difference (S16); and driving a first and a second cooling fans 14a and 14b and an air valve 33 as long as the temperature gain, to perform cooling (S17).

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The apparatus and method for controlling cooling of a gantry having a linear motor of the present invention will now be described with reference to the accompanying drawings.

Figure 2:
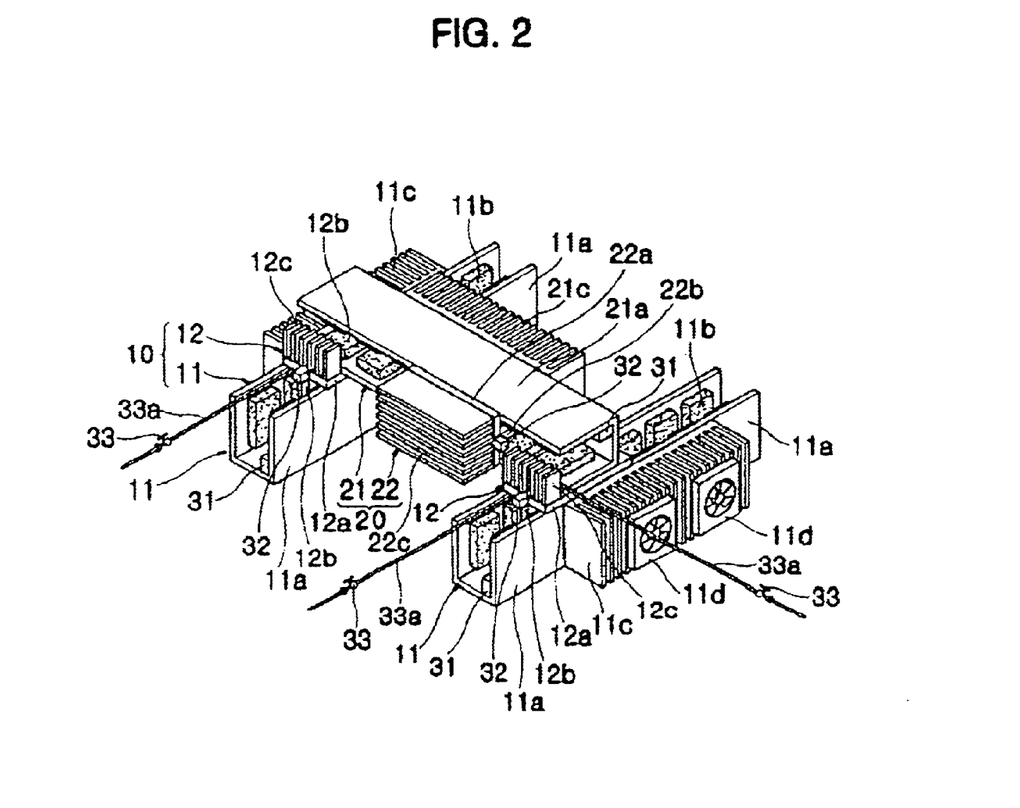
FIG. 2 is a perspective view of an apparatus for controlling cooling of a gantry adopting a linear motor in accordance with the present invention.
Figure 3:
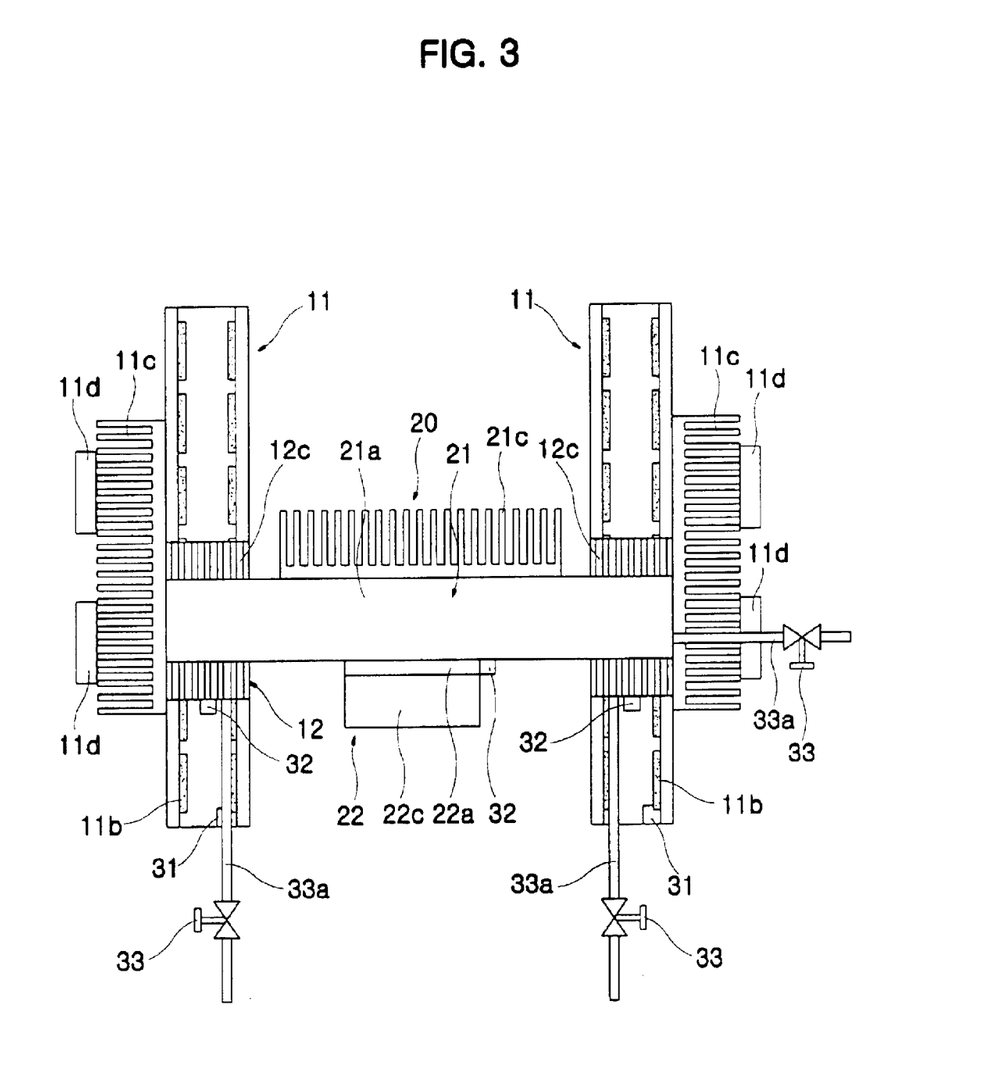
FIG. 3 is a plan view of the apparatus for controlling cooling of a gantry of FIG. 2 in accordance with the present invention.
Figure 4:
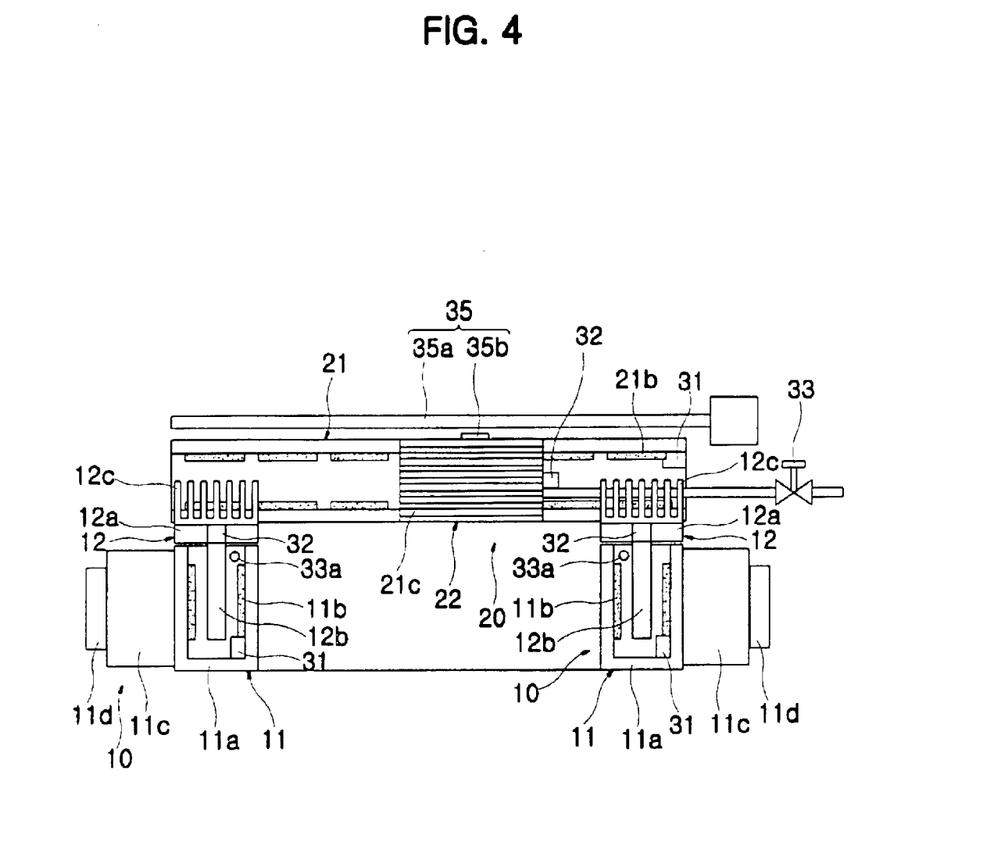
FIG. 4 is a side view of the apparatus for controlling cooling of a gantry of FIG. 2 in accordance with the present invention.

First, as shown in FIGS. 2 through 4, the apparatus for controlling cooling of a gantry includes a Y-axis linear motor 10 installed at a Y-frame (not shown) of a gantry and an X-axis linear motor 20 installed at an X-frame (not shown) of the gantry.

As shown in FIGS. 2 and 3, the Y-axis linear motor 10 includes a stator 11 and a mover 12.

The stator 11 includes a 'U'-type frame 11a and a plurality of permanent magnets 11b arranged at predetermined intervals on both side surface inside the 'U'-type frame 11a.

As shown in FIGS. 2 and 4, a first temperature sensor 31 is installed at an inner predetermined portion of the 'U'-type frame 11a, and a heat sink 11c is installed at a predetermined portion of the 'U'-type frame 11a. A plurality of cooling fans 11d are installed at predetermined portions of the heat sink 11c.

The mover 12 includes a flat-type frame 12a and a coil block 12b installed at the lower surface of the flat-type frame.

A second temperature sensor 32 is installed at one side of the flat-type frame 12a, and a heat sink 12c is installed at the upper portion of the flat-type frame 12a.

A valve 33 which forms a nozzle 33a for cooling the mover 12 is installed at the upper side of the coil block 12b.

Meanwhile, the X-axis linear motor 20, as shown in FIGS. 2 and 3, includes a stator 21 and a mover 22.

The stator 21 includes a 'U'-type frame 21a and a plurality of permanent magnets 21b arranged at predetermined intervals at both side surfaces inside the 'U'-type frame 21a.

A first temperature sensor 31 is installed at an inner portion of the 'U'-type frame 21a, and a heat sink 21c is installed at an outer portion of the 'U'-type frame 21a.

The mover 22 includes a flat-type frame 22a and a coil block 22b installed at the lower surface of the flat-type frame 22a.

A second temperature sensor 32 is installed at one side of the flat-type frame 22a, and a heat sink 22c is installed at the upper portion of the flat-type frame 22a.

A valve 33 which forms a nozzle 33a is installed at the upper side of the coil block 22b to cool the mover 22.

In order to sense a position and a velocity of the mover 22, as shown in FIG. 4, there is provided an encoder 35. As a linear encoder, the encoder 35 includes an indication member 35a and an optical sensor 35b installed spaced apart from the mover 22.

An encoder periphery sensor part 34 is installed at one side of the indication member 35b, to measure peripheral environment of the encoder 35 and generate a peripheral environment signal, that is, an analog signal. That is, the encoder periphery sensor part 34 includes sensors to measure a humidity, a temperature and a pressure around the encoder 35.

Figure 5:
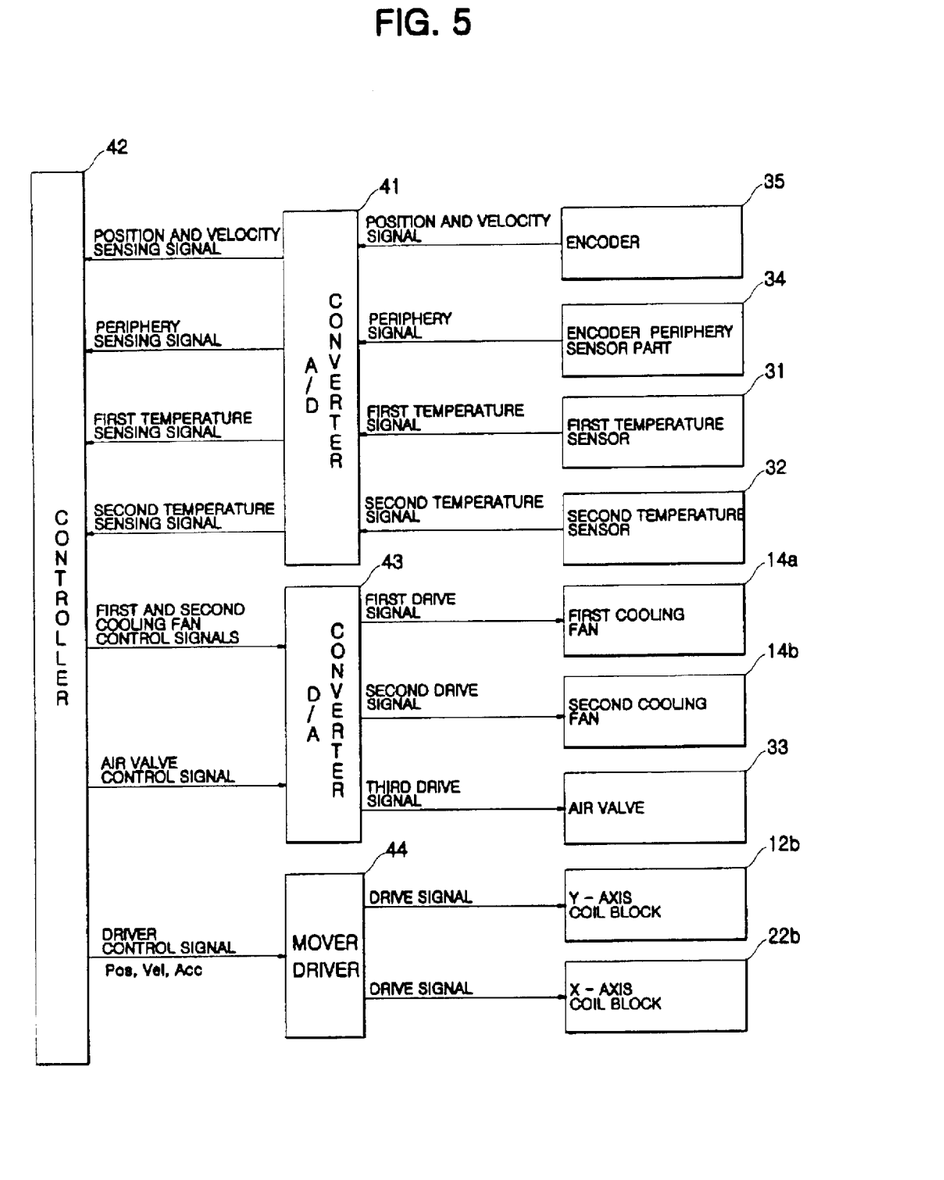
FIG. 5 is a block diagram for explaining an apparatus and method for controlling cooling of the gantry of FIG. 2 in accordance with the present invention.

Meanwhile, as for the apparatus for controlling cooling of a gantry having a linear motor as shown in FIG. 5, a controller 42 generates and outputs a driver control signal such as a position, a velocity or an acceleration control signal to a mover driver 44.

The mover driver 44 generates a drive signal and transmits it to a coil block 22b, so that current flows to the coil block 22b, according to which the linear motor is operated.

The encoder periphery sensor part 34 measures peripheral environment (i.e., temperature, humidity or pressure, etc.) and generates a periphery signal, and the encoder 35 senses the velocity and the position of the mover 22 and generates an encoder signal.

The first and the second temperature sensors 31 and 32 generates a first and a second temperature sensor signals, respectively. The first and the second temperature sensor signals are converted into digital signals by an A/D converter 41 and inputted to the controller 42.

The controller 42 receives the inputted signals and compares them with a pre-set environment values.

In case that inputted peripheral environment values are greater than the pre-set environment values (that is, the linear motor has been for a long time and overheated), the controller 42 controls in a manner that the first and the second cooling fan control signals and the air valve control signal, that is, the digital signals, outputted from the controller 42 are converted into analog signals by a D/A converter 43, and a first and a second driver signals are received to drive the first and the second cooling fans 14a and 14b and the air valve 33, thereby performing cooling.

Besides, in case that the Y-axis linear motor 10 and the X-axis linear motor 20 are overheated while being cooled, the velocity of each of the Y-axis linear motor 10 and the X-axis linear motor 20 is controlled to sink the overheat as generated.

Figure 6:
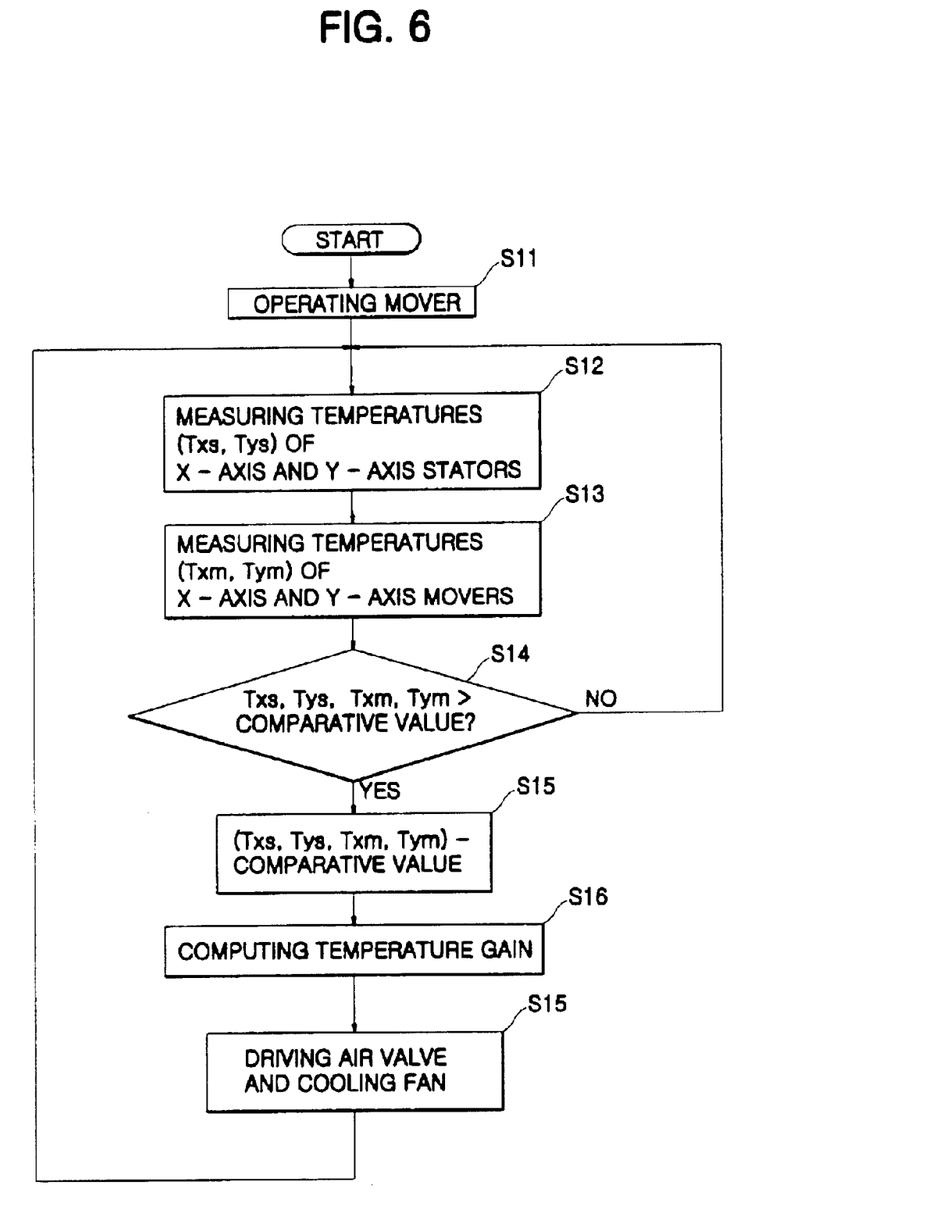
FIG. 6 is a flow chart of the method for controlling cooling of a gantry of FIG. 2 in accordance with one embodiment of the present invention.

The method for controlling cooling of a gantry having a linear motor of the present invention will now be described with reference to FIGS. 5 and 6.

The movers 12 and 22 are moved to move the module head (not shown) in the gantry having the Y-axis linear motor 10 and the X-axis linear motor 20 (S11) In this respect, in order to move the movers 12 and 22, the controller 42 generates a driver signal, such as a position control signal (POS), a velocity control signal (VEL) or an acceleration control signal (ACC), and transmits it to the mover driver 44.

According to the driver control signal received from the controller 42, the mover driver 44 generates a drive signal corresponding to the drive signal and transmits it to the Y-axis coil block 12b and the X-axis coil block 22b to thereby move the movers 12 and 22.

While the movers 12 and 22 are being moved to perform an operation, the first temperature sensor 31 and the second temperature sensor 32 sense heat generated from the Y-axis linear motor 10 and the X-axis linear motor 20, respectively.

First, the first temperature sensor 31 measures temperatures (Txs, Tys) of the X-axis and Y-axis stators 11 and 21 (S12), and subsequently, the second temperature sensor 32 measures the temperatures (Txm, Tym) of the X-axis and Y-axis movers 12 and 22 (S13) The first and the second temperature sensors 31 and 32 respectively output a first and a second temperature signals, which are received by the A/D converter 41.

According to the first and the second temperature sensing signal outputted form the A/D converter 41, the temperature information (Txs, Tys, Txm, Tym) of the stators 11 and 21 and of the movers 12 and 22 are stored and then compared with the comparative value of pre-set temperature (S14).

After the controller 42 stores the temperature information (Txs, Tys, Txm, Tym), it compares them with the comparative value. If the values of temperature information (Txs, Tys, Txm, Tym) are greater than the pre-set comparative value, the controller 42 computes a difference between them (S15).

According to the computed temperature difference, the controller 42 computes a temperature gain (S16). And then, the controller 42 distributes the amount as much as the temperature gain as a first and a second cooling fan control signal and an air valve control signal, transmits them to the D/A converter 43, so that the D/A converter 43 converts them into a first through a third drive signals, that is, analog signals, thereby driving the first and the second cooling fans 14a and 14b and the air valve 33 and cooling the linear motor (S17).

Figure 7:
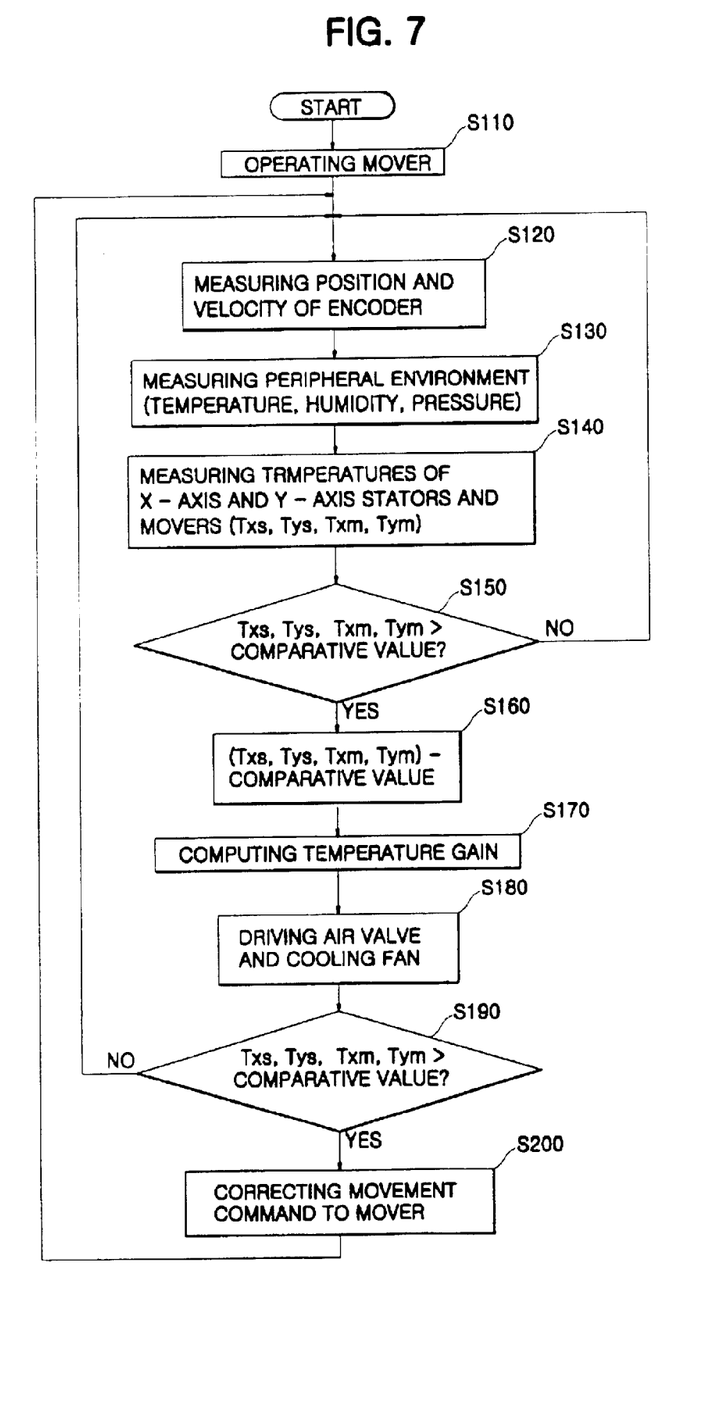
FIG. 7 is a flow chart of a method for controlling cooling of a gantry in accordance with another embodiment of the present invention.

FIG. 7 is a flow chart of a method for controlling cooling of a gantry in accordance with another embodiment of the present invention.

With reference to FIG. 7, movers 12 and 22 are moved in order to move the module head (not shown) in the gantry having the Y-axis linear motor 10 and the X-axis linear motor 20. In this respect, in order to move the movers 12 and 22, the controller 42 generates a driver signal, such as a position control signal (POS), a velocity control signal (VEL) or an acceleration control signal (ACC), and transmits it to the mover driver 44.

Next, the encoder 35 measures a position and a velocity of the mover (S120).

And, the encoder periphery sensor part 34 measures the peripheral environment, such as temperature, humidity and pressure (S120). The A/D converter 41 converts a position signal and a velocity signal of the encoder 35 and a periphery signal of the encoder periphery sensor part 34 into digital signals, which are inputted to the controller 42.

The first temperature sensor 31 measures temperatures (Txs, Tys) of the X-axis and Y-axis stators 11 and 21, and the second temperature sensor 32 measures the temperatures (Txm, Tym) of the X-axis and Y-axis movers 12 and 22 (S140). The first and the second temperature sensors 31 and 32 respectively output a first and a second temperature signals, which are received by the A/D converter 41.

According to the first and the second temperature sensing signal outputted form the A/D converter 41, the temperature information (Txs, Tys, Txm, Tym) of the stators 11 and 21 and of the movers 12 and 22 are stored and then compared with the comparative value of the preset temperature (S150).

After the controller 42 stores the temperature information (Txs, Tys, Txm, Tym), it compares them with the comparative value. If the values of temperature information (Txs, Tys, Txm, Tym) are greater than the pre-set comparative value, the controller 42 computes a difference between them (S160).

According to the computed temperature difference, the controller 42 computes a temperature gain (S170). And then, the controller 42 distributes the amount as much as the temperature gain as a first and a second cooling fan control signal and an air valve control signal, transmits them to the D/A converter 43, so that the D/A converter 43 converts them into a first through a third drive signals, that is, analog signals, thereby driving the first and the second cooling fans 14a and 14b and the air valve 33 and cooling the linear motor (S180).

And then, after the first and the second cooling fans 14a and 14b and the air valve 33 are cooled (S180), the temperatures (Txs, Tys, Txm, Tym) and the comparative value are compared again (S190).

In case that the values of the temperature information (Txs, Tys, Txm, Tym) are smaller than the comparative value, it returns to the step S120.

Meanwhile, in case that the values of the temperature information (Txs, Tys, Txm, Tym) are greater than the comparative value, the movement command to the movers 12 and 22 is corrected (S200).

In this manner, in case that the plurality of Y-axis linear motors and the X-axis linear motor adopted to the gantry are overheated, the driving signals to be transmitted to each coil block are controlled to reduce the velocity of the plurality of Y-axis linear motors and the X-axis linear motor to be driven, so that the plurality of Y-axis linear motors and the X-axis linear motor are prevented from overheating.

As so far described, the apparatus and method for controlling cooling of a gantry having a linear motor have the following effect. That is, in case that the linear motor adopted to the gantry is overheated, the driver signal transmitted to the coil block is controlled to adjust the velocity of the linear motor, so that the overheat generated in the linear motor is removed, and thus, the linear motor is prevented from malfunctioning.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for controlling cooling of a gantry having at least one linear motor, comprising:
   at least one stator comprising a first temperature sensor, a heat sink, and a cooling fan at predetermined portions of the at least one stator;
   at least one mover comprising a second temperature sensor and a heat sink installed on an upper surface of the at least one mover;
   an encoder configured to sense at least one of a position and velocity of the at least one mover;
   an encoder periphery sensor attached proximate to the encoder and configured to measure at least one of a surrounding temperature, humidity, or pressure;
   an A/D converter configured to receive a surrounding environment signal corresponding to at least one of a surrounding temperature, humidity, and pressure from the encoder periphery sensor, a position and velocity signal from the encoder and a first temperature signal and a second temperature signal from the first and second temperature sensors and to convert the surrounding environment signal, the position and velocity signal, and the first and second temperature signals from analog signals to digital signals and output the digital signals;
   at least one mover driver configured to provide a drive signal to a coil block attached to the mover;
   a controller configured to control a drive signal output from the at least one mover driver to control the velocity of the at least one linear motor and to receive the digital signals output by the A/D converter and output at least one of a cooling fan control digital signal and an air valve control digital signal; and
   a D/A converter configured to receive from the controller and to convert at least one of the cooling fan control digital signal and the air valve control digital signal to an analog drive signal and output the analog drive signal to at least one of a cooling fan and an air valve.

2. The apparatus of claim 1, wherein the encoder comprises an indication member for indicating position information of the at least one mover and an optical sensor for reading the position information.

3. The apparatus of claim 1, wherein the at least one mover further comprises a nozzle connected to the air valve and configured to cool the at least one mover, wherein the D/A converter is configured to receive the air valve control digital signal and output the analog drive signal to control the air valve.

4. A method for controlling cooling of a gantry having at least one linear motor, comprising:
   operating at least one mover and at least one stator of the at least one linear motor;
   measuring temperatures of the at least one mover and the at least one stator;
   storing the measured temperatures;
   comparing the measured temperatures with a pre-set temperature value;
   computing a difference between the pre-set temperature value and the measured temperatures if the measured temperatures are greater than the pre-set temperature value;
   computing a temperature gain corresponding to the computed temperature difference;
   driving at least one of a cooling fan and an air valve as long as the temperature gain is greater than a pre-set gain value; and
   controlling movements of the at least one linear motor based on the comparison of the measured temperatures with the pre-set temperature value.

5. A method for controlling cooling of a gantry comprising at least one linear motor having a stator and a mover, comprising:
   operating the mover in accordance with a movement command;
   measuring at least one of a position and a velocity of the mover with an encoder;
   making a first measurement of at least one of environmental temperature, humidity, or pressure;
   determining first temperature values of the stator and the mover;
   storing the first temperature values;
   comparing each of the first measurement of at least one of environmental temperature, humidity, or pressure and the first temperature values with a pre-set value;
   computing a difference between each of the first measurement of at least one of environmental temperature, humidity, or pressure and the first temperature values and the pre-set value in the case that at least one of the first measurement of at least one of environmental temperature, humidity, or pressure and the first temperature values is greater than the pre-set value;
   computing a temperature gain from the temperature difference;
   driving at least one of a cooling fan and an air valve in accordance with the temperature gain;
   determining second temperature values of the stator and the mover;
   storing the second temperature values;
   comparing each of the first measurement of at least one of environmental temperature, humidity, or pressure and the second temperature values with the pre-set value; and
   correcting a movement command if at least one of the first measurement of at least one of environmental temperature, humidity, or pressure and the second temperature values is greater than the pre-set value using the measured at least one of a position and a velocity of the mover.

6. The method of claim 5, wherein if at least one of the first measurement of at least one of environmental temperature, humidity, or pressure and the second temperature values is less than the pre-set value, then the method returns to measuring at least one of a position and a velocity of the encoder.

7. A cooling system for a gantry having a linear motor, comprising:
   an x-y gantry;
   a linear motor of the gantry comprising a temperature sensor provided for each of the stator and rotor of the linear motor and configured to produce a linear motor temperature signal;
   a processor configured to receive the linear motor temperature signal and produce a first control signal in accordance with a difference between a sensed temperature of the linear motor and a prescribed value;
   a first cooling device configured to cool the linear motor in accordance with the first control signal; and
   a second cooling device configured to cool the linear motor in accordance with a second control signal from the processor, wherein the first cooling device and the second cooling device are different types of devices.

8. The cooling system of claim 7, wherein the first cooling device comprises a fan.

9. The cooling system of claim 7, wherein the first cooling device comprises a nozzle connected to a valve and configured to supply a flow of cooling air to the linear motor.

10. The cooling system of claim 7, wherein the temperature sensor comprises multiple temperature sensors that are positioned on different portions of the linear motor.

11. The cooling system of claim 7, wherein the first cooling device is configured to cool a stator of the liner motor.

12. The cooling system of claim 7, wherein the first cooling device is configured to cool a mover of the linear motor.

13. A cooling system for a gantry having a linear motor, comprising:
    an x-y gantry;
    a linear motor of the gantry comprising a temperature sensor provided for each of the stator and mover of the linear motor and configured to produce a linear motor temperature signal;
    a processor configured to receive the linear motor temperature signal and produce a first control signal in accordance with a difference between a sensed temperature of the linear motor and a prescribed value;
    a first cooling device configured to cool the linear motor in accordance with the first control signal; and
    a linear motor controller configured to control movements of the linear motor in accordance with a second control signal produced by the processor.

14. The cooling system of claim 13, wherein the processor is configured to produce the second control signal which causes the linear motor controller to reduce a speed of a mover of the linear motor when the processor determines that the sensed temperature of the linear motor is above a predetermined temperature.

15. A cooling system for a gantry having a linear motor, comprising:
    an x-y gantry;
    a linear motor of the gantry comprising a temperature sensor provided for each of the stator and mover of the linear motor and configured to produce a linear motor temperature signal;
    a processor configured to receive the linear motor temperature signal and produce a first control signal in accordance with a difference between a sensed temperature of the linear motor and a prescribed value;
    a first cooling device configured to cool the linear motor in accordance with the first control signal; and
    an environment sensor configured to sense at least one of an environmental temperature, pressure or humidity and produce an environment signal in accordance thereto, wherein the processor is further configured to produce the first control signal based on the environment signal.

16. A cooling system for a gantry having a linear motor, comprising:
    an x-y gantry;
    a linear motor of the gantry comprising a temperature sensor configured to produce a linear motor temperature signal, wherein the temperature sensor comprises:
        a stator temperature sensor configured to sense a temperature of a stator of the linear motor and to produce a stator temperature signal; and
        a mover temperature sensor configured to sense a temperature of a mover of the linear motor and to produce a mover temperature signal;
    a processor configured to receive the linear motor temperature signal and produce a cooling control signal and a driver control signal in accordance with a difference between the linear motor temperature signal and a predetermined value;
    a cooling device configured to cool the linear motor in accordance with the cooling control signal; and
    a motor driver configured to control movements of the linear motor in accordance with the driver control signal.

17. The cooling system of claim 16, wherein the motor driver varies a velocity of the linear motor in accordance with the driver control signal.

18. The cooling system of claim 16, wherein the processor is configured to receive both the stator temperature signal and the mover temperature signal, and wherein the processor produces the cooling control signal and the driver control signal in accordance with a difference between the stator temperature signal and a first predetermined value and a difference between the mover temperature sensor and a second predetermined value.

19. The cooling system of claim 18, wherein the first predetermined value is equal to the second predetermined value.

20. The cooling system of claim 18, wherein the cooling device comprises:
    a first cooling device configured to cool the stator; and
    a second cooling device configured to cool the mover.

21. The cooling system of claim 20, wherein the processor is configured to produce a first cooling control signal and a second cooling control signal, wherein the first cooling device is configured to cool the stator in accordance with the first cooling control signal, and wherein the second cooling device is configured to cool the mover in accordance with the second cooling control signal.

22. A method of cooling a linear motor of a gantry, comprising:
    measuring a temperature of the linear motor of the gantry;
    comparing the temperature of the linear motor with a predetermined value; and
    activating a cooling device configured to cool the linear motor if the temperature of the linear motor is greater than the predetermined value, wherein the measuring step comprises:
    measuring a temperature of a stator of the linear motor;
    measuring a temperature of a mover of the linear motor; and
    measuring at least one of environmental temperature, pressure and humidity, and wherein the activating step is also performed based on the measured at least one environmental temperature, pressure or humidity.

23. The method of claim 22, wherein the activating step comprises activating at least one of a fan and a nozzle configured to deliver cooling air to the linear motor.

24. A method of cooling a linear motor of a gantry, comprising:
    measuring a temperature of the linear motor of the gantry;
    comparing the temperature of the linear motor with a predetermined value; and activating a cooling device configured to cool the linear motor if the temperature of the linear motor is greater than the predetermined value, wherein the measuring step comprises:

measuring a temperature of a stator of the linear motor; and measuring a temperature of a mover of the linear motor; wherein the activating step comprises:

activating a first cooling device configured to cool the stator of the linear motor if the temperature of the stator is greater than the predetermined value; and     activating a second cooling device configured to cool the mover of the linear motor if the temperature of the mover is greater than the predetermined value.

25. A method of cooling a linear motor of a gantry, comprising:

measuring a temperature of the linear motor of the gantry;

comparing the temperature of the linear motor with a predetermined value; and activating a cooling device configured to cool the linear motor if the temperature of the linear motor is greater than the predetermined value, wherein the measuring step comprises:

measuring a temperature of a stator of the linear motor;

measuring a temperature of a mover of the linear motor; and reducing an operating speed of the linear motor if the temperature of the linear motor is greater than the predetermined value.

\* \* \* \* \*